United States Patent [19]

Takaoka et al.

[11] Patent Number: 4,923,170
[45] Date of Patent: May 8, 1990

[54] HYDRAULIC PRESSURE CONTROL VALVE

[75] Inventors: Tokuro Takaoka; Tsuto Sasaki; Yukio Kobayashi, all of Wako; Koichi Saito, Hadano; Satoshi Hamano, Odawara, all of Japan

[73] Assignees: Honda Giken Kogyo Kabushiki Kaisha, Tokyo; Seiki Giken Kogyo Kabushiki Kaisha, Gotenba, both of Japan

[21] Appl. No.: 262,395

[22] Filed: Oct. 25, 1988

[30] Foreign Application Priority Data

Oct. 26, 1987 [JP] Japan .......................... 62-163478[U]

[51] Int. Cl.$^5$ ............................................. F16K 47/04
[52] U.S. Cl. ..................................... 251/121; 180/143; 251/324
[58] Field of Search ............... 180/143; 251/121, 205, 251/324

[56] References Cited

U.S. PATENT DOCUMENTS 3,589,401  6/1971  Harding .......................... 251/324 X
4,000,785  1/1977  Nishikawa et al. .
4,760,892  8/1988  Duffy .............................. 137/625.65

Primary Examiner—Gerald A. Michalsky
Attorney, Agent, or Firm—Armstrong, Nikaido, Marmelstein, Kubovcik & Murray

[57] ABSTRACT

A hydraulic pressure control valve comprises a valve body having a slide bore of a circular cross-section and an inlet port and an outlet port opened into an inner surface of the slide bore at axially spaced apart points, and a valve spool slidably received in the valve body for axially sliding movement and defining, by cooperation with the valve body, a variable orifice for controlling the degree of communication between the inlet and outlet ports. In the hydraulic pressure control valve, a smaller diameter portion defining an annular oil passage between an inner surface of the slide bore is provided on the valve spool coaxially with the slide bore to define the variable orifice, and has an outside diameter set constant over axially entire length. This facilitates the dimensional control of the variable orifice, so that the variation in property of the variable orifice for every hydraulic pressure control valve may be easily suppressed.

4 Claims, 3 Drawing Sheets

HYDRAULIC PRESSURE CONTROL VALVE

BACKGROUND OF THE INVENTION

The present invention relates to a hydraulic pressure control valve comprising a valve body having a slide bore of a circular cross-section and an inlet port and an outlet port which are opened into an inner surface of the slide bore at axially spaced apart points, and a valve spool slidably received in the valve body for axially sliding movement and defining, by cooperation with the valve body, a variable orifice for controlling the degree of communication between the inlet and outlet ports.

In such prior art hydraulic pressure control valves, for example, as shown in FIG. 3, a variable orifice 45' is defined by a tapered portion 35'e provided on a valve spool 35' slidably received in a valve body 34' and by an inlet port 32'. Similarly, as shown in FIG. 4, a variable orifice can be defined by a notch surface 35'f provided on the valve spool 35' and by the inlet port 32'.

With the prior art hydraulic pressure control valves, however, a severe dimensional control must be provided during production in order to provide the same property of variable orifice for every hydraulic pressure control valve made resulting in a difficult machining. Specifically, when dimensions and h are determined as shown in FIG. 3, the differential pressure $\Delta P$ across the variable orifice 45' is represented by a relation $\Delta P \propto /h^3$. If the value varies, the value h also varies. Therefore, unless severe dimensional controls of the values and h must be provided simultaneously, a variation may be produced in property of the variable orifice for every hydraulic pressure control valve. This is also true with the other prior art shown in FIG. 4.

SUMMARY OF THE INVENTION

The present invention has been accomplished with such circumstances in view, and it is an object of the present invention to provide a hydraulic pressure control valve constructed so that the variation in property for every hydraulic pressure control valve is suppressed to easily improve the controlled dimensional accuracy of a variable orifice.

To attain the above object, according to the present invention, there is proposed a hydraulic pressure control valve comprising a valve body having a slide bore of a circular cross-section and uniform diameter and an inlet port and an outlet port which are opened into an inner surface of the slide bore at axially spaced apart points, and a valve spool slidably received in the valve body for axially sliding movement and defining, by cooperation with the valve body, a variable orifice for controlling the degree of communication between the inlet and outlet ports, wherein a smaller diameter portion defining an annular oil passage between an inner surface of the slide bore is provided on the valve spool coaxially with the slide bore to define the variable orifice, and wherein the smaller diameter portion has an outside diameter set constant over the axially entire length thereof.

With the above construction, the smaller diameter portion defining the annular passage between the inner surface of the slide bore is provided on the valve spool coaxially with the slide bore and has an outside diameter set constant over the axially entire length thereof. Therefore, only controlling of the feed of an edged tool during machining enables the smaller diameter portion to be formed with a higher accuracy by machining. This facilitates the dimensional control of the variable orifice, so that the variation can be easily suppressed in property of the variable orifice for every hydraulic pressure control valve so made.

BRIEF DESCRIPTION OF THE DRAWINGS

The above and other objects, features and advantages of the invention will become apparent from reading of the following description of the preferred embodiment, taken in conjunction with the accompanying drawings, wherein:

FIG. 1 is a diagram of a hydraulic pressure circuit for a vehicle speed-responsive type hydraulic power steering system to which is applied the hydraulic pressure control valve of the present invention, and FIG. 2 is an enlarged view in longitudinal section of the hydraulic pressure control valve;

DESCRIPTION OF THE PREFERRED EMBODIMENTS

Figure 1:
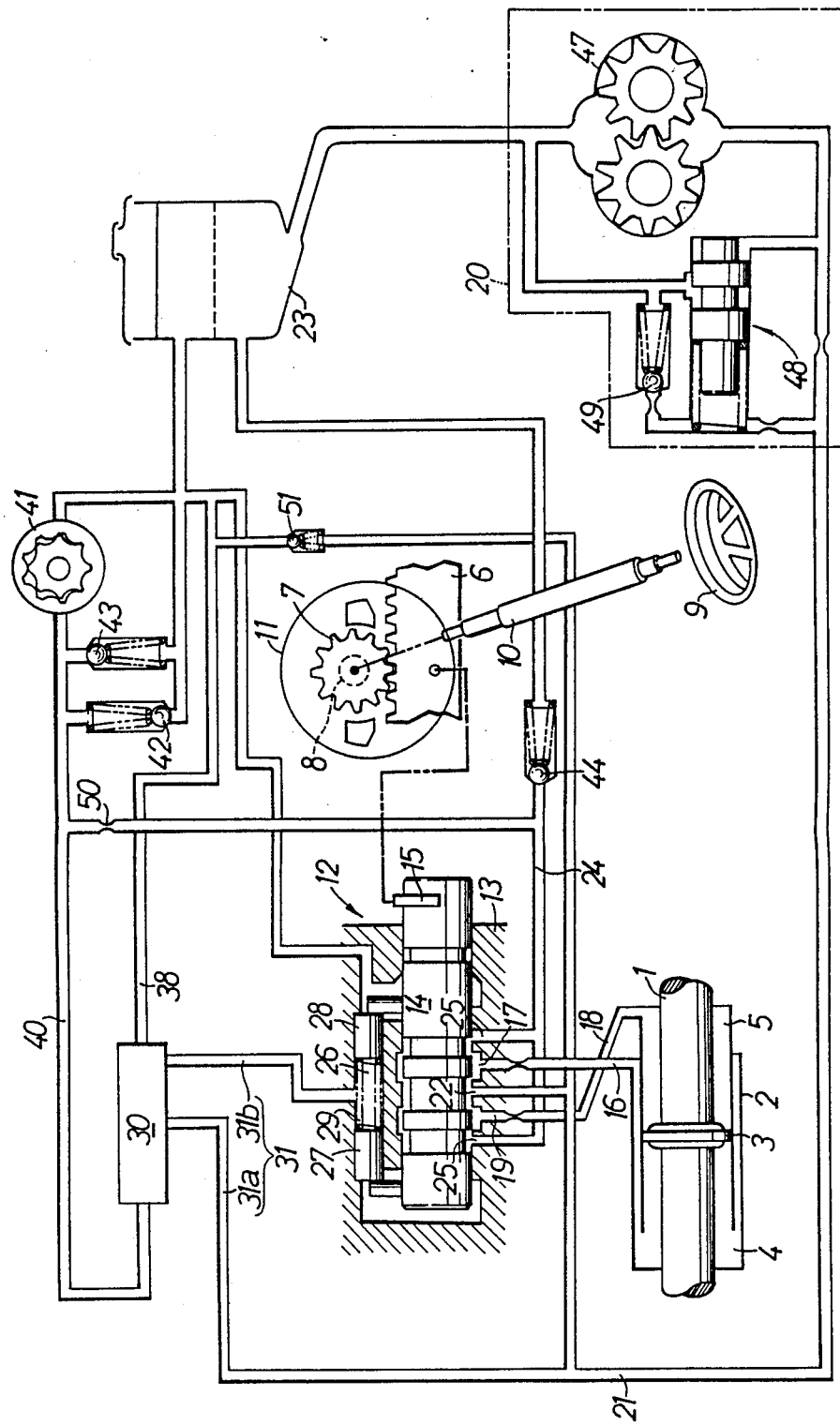
FIGS. 1 and 2 illustrate one embodiment of a hydraulic pressure control valve according to the present invention.

The present invention will now be described by way of one embodiment which is applied in a vehicle speed-responsive type hydraulic power steering system. Referring first to FIG. 1, a power cylinder 2 is formed on a portion of a rack rod 1 connected to a pair of left and right steering wheels which are not shown. The interior of the power cylinder 2 is divided into a pair of left and right hydraulic oil chambers 4 and 5 by a piston 3 integrally provided on the rack rod 1.

A pinion 7 is meshed with a rack 6 provided on the rack rod 1. A steering shaft 10 connected to a steering wheel 9 is connected to a pinion shaft 8 having the pinion 7 provided thereon. The pinion 7 is carried by a pinion holder 11 having a rotational center at a point eccentric from a rotational center of the pinion 7, so that when a load on the rack rod 1 increases due to the rotation of the pinion 7 with the rotation of the steering shaft 10, a counterforce acts on the pinion 7 to move it in an axial direction of the rack rod 1, thereby rotating the pinion holder 11.

A directional control valve 12 is operatively connected to the pinion holder 11 to switch change-over positions in accordance with the rotational motion of the steering shaft 10. The directional control valve 12 comprises a valve spool 14 contained in a valve casing 13, the valve spool 14 being connected to the pinion holder 11 at a place offset from its rotational center through a pin 15.

The valve casing 13 is provided with a port 17 communicating with one hydraulic oil chamber 4 in the power cylinder 2 through an oil passage 16, a port 19 communicating with the other hydraulic oil chamber 5 in the power cylinder 2 through an oil passage 18, an oil supply port 22 connected to a hydraulic working oil source 20 through an oil supply passage 21, and an oil discharge port 25 connected to an oil tank 23 through an oil discharge passage 24 and a pressure-regulating valve 44. Furthermore, the valve spool 14 is changeable over between a position in which the oil supply port 22 is permitted to communicate with the one port 19, while the oil discharge port 25 is permitted to communicate with the other port 17, and a position in which the oil supply port 22 is permitted to communicate with the other port 17, while the oil discharge port 25 is permitted to communicate with the one port 19.

A plurality of, e.g., two hydraulic reaction chambers 26 are provided in the valve casing 13 around the valve spool 14. The hydraulic reaction chambers 26 are defined between a pair of plungers 27 and 28 opposed to each other for movement in a direction parallel to the valve spool 14. A spring 29 is contained in the hydraulic reaction chamber 26 for biasing both plungers 27 and 28 away from each other. Moreover, both plungers 27 and 28 are engaged with the valve spool 14, so that a hydraulic pressure supplied in the hydraulic reaction chamber 26 biases the valve spool 14 toward a neutral position.

Figure 2:
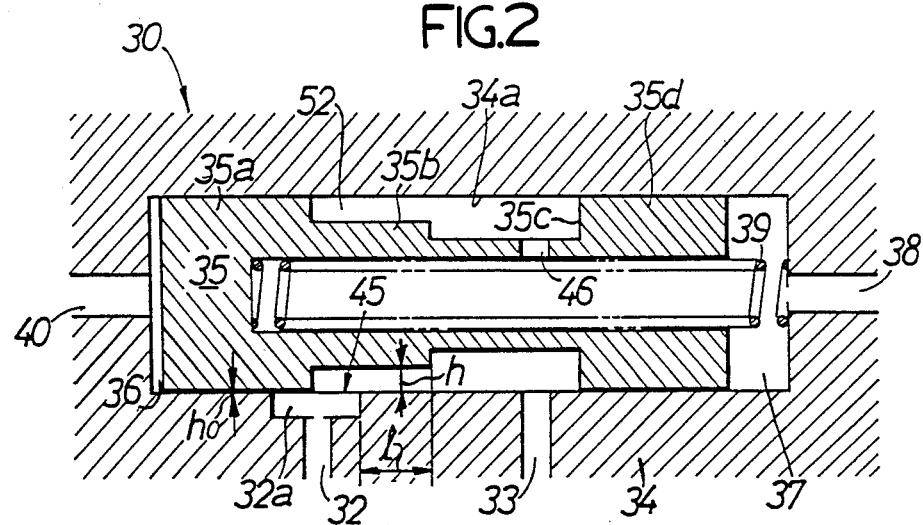

Referring also to FIG. 2, the hydraulic reaction chamber 26 and the oil supply passage 21 are interconnected by a communication oil passage 31 having, on the way thereof, a hydraulic pressure control valve 30 according to one embodiment of the present invention. The hydraulic pressure control valve 30 comprises a bottomed cylindrical valve spool 35 slidably received in a valve body 34 that has a slide bore 34a of a circular cross-section and an inlet port 32 and an outlet port 33 which are opened in an inner surface of the slide bore 34a at axially spaced apart points. A pilot hydraulic oil chamber 36 is defined between a closed end of the valve spool 35 and one end wall of the slide bore 34a. A spring chamber 37 is defined between an opened end of the valve spool 35 and the other end wall of the slide bore 34a. The spring chamber 37 communicates with the oil tank 23 through an oil releasing passage 38, and the oil supply passage 21 is connected to the oil releasing passage 38 through a unidirectional valve 51 which permits only flowing of an oil from the oil releasing passage 38. Further, a spring 39 is contained in the spring chamber 37 for biasing the valve spool 35 in an opening direction.

The inlet port 32 is made in the valve body 34 at a point closer to the pilot hydraulic oil chamber 36. An upstream portion 31a of the communication oil passage 31 is connected to the inlet port 32. The outlet port 33 is made in the valve body 34 at a point spaced apart from the inlet port 32 toward the spring chamber 37. A downstream portion 31b of the communication oil passage 31 is connected to the outlet port 33.

An intake passage 40 is connected at one end thereof to the pilot hydraulic oil chamber 36 and at the other end thereof to an intake port in a vehicle-speed sensor 41 which increases the amount of oil drawn depending upon the increase in vehicle speed and is shown as a trochoid-type hydraulic oil pump. A discharge port of the vehicle-speed sensor 41 is connected to the oil tank 23. There are a relief valve 42 and a check valve 43 connected to bypass the intake and discharge ports of the vehicle-speed sensor 41. Further, the oil discharge passage 24 connected to the oil tank 23 through the pressure-regulating valve 44 is connected to the pilot hydraulic chamber 36 through a sensor orifice 50.

A variable orifice 45 is provided between the valve spool 35 and the inlet and outlet ports 32 and 33 in the valve body 34. The variable orifice 45 is defined by a smaller diameter portion 35b and an opened end 32a of the inlet port 32 into the inner surface of the slide bore 34a. The smaller diameter portion is connected through a step to a land portion 35a provided on the valve spool 35 to come into slidable contact with the inner surface 34a on the side of the inlet port 32 and is provided on the valve spool 35 to define an annular oil passage 52 between the smaller diameter portion and the inner surface of the slide bore 34a. The opened end 32a is formed to be axially relatively long. In addition, an outer surface of the smaller diameter portion 35b is formed coaxially with the slide bore 34a to have the same radius over the entire length thereof. Thus, the spacing, i.e., diametrical distance between the inner surface of the slide bore 34a and the outer surface of the smaller diameter portion 35b is set at the same level over the entire length of the smaller diameter portion 35b. An annular groove 35c is also provided between the smaller diameter portion 35b and a land portion 35d provided on the valve spool 35 to come into slidable contact with the inner surface of the slide bore 34a on the side of the outlet port 33. Further, an invariable orifice 46 is perforated in the valve spool 35 to the spring chamber at a point corresponding to the annular groove 35c.

If the distance between an axially inner end of the opened end 32a and an end edge of the smaller diameter portion 35b closer to the annular groove 35c is represented by , and the distance between the outer surface of the smaller diameter portion 35b and the inner surface of the slide bore 34a is represented by h, the differential pressure $\Delta P$ produced across the variable orifice 45 is represented by the following relation:

$$\Delta P \propto /h^3$$

Accordingly, the differential pressure $\Delta P$ is determined by the dimensions and h.

Now, the distance h is set to be sufficiently large in respect to the distance $h_0$ between the outer surface of the land portion 35a and the inner surface of the slide bore 34a (h $> h_0$). In other words, the distance h is set such that the flow rate of the oil leaked from between the land portion 35a and the slide bore 34a may be sufficiently smaller than the flow rate of the oil flowing through the hydraulic reaction chamber 26. Here, the relation between the hydraulic pressure in the pilot hydraulic chamber 36 and the vehicle speed is as follows: If the hydraulic pressure in the oil discharged passage 24 and regulated by the pressure-regulating valve 44 is represented by $P_0$; the hydraulic pressure in the pilot hydraulic oil chamber 36 is represented by $P_1$; the opened area of the sensor orifice 50 is represented by A; the density of the working oil is represented by $\rho$; and the coefficient of flow rate is by $\alpha$, the flow rate $q_0$ of the working oil passing through the sensor orifice 50 is determined by the following equation:

$$q_0 = \alpha A \{2(P_0 - P_1)/\rho\}^{1/2} \qquad (1)$$

In addition, the flow rate $q_1$ of the oil pumped by the vehicle-speed sensor 41 is determined by the following equation:

$$q_1 = mV \qquad (2)$$

wherein V represents the vehicle speed, and m is a constant. If there is no leak from each part, $q_0 = q_1$ and hence, from the equations (1) and (2), there is established $$\alpha A \{2(P_0 - P_1)/\rho\}^{\frac{1}{2}} = mV$$

$$\therefore P_1 = P_0 - \rho m^2 V^2 / 2\alpha^2 A^2 \qquad (3)$$

As evident from the equation (3), the hydraulic pressure $P_1$ in the pilot hydraulic oil chamber 36 decreases as the vehicle speed increases.

From the provision of the variable orifice 45 and the invariable orifice 46 in the hydraulic pressure control valve 30, the hydraulic pressure P' in the hydraulic reaction chamber 26 during travelling of a vehicle is represented by the following equation:

$$P' = S_V{}^2 P/(S_F{}^2 + S_F{}^2) \qquad (4)$$

wherein Sv is an opened area of the variable orifice 45; $S_F$ is an opened area of the invariable orifice 46; and P is a hydraulic pressure in the oil supply passage 21. The Sv increases as the vehicle speed increases.

The hydraulic working oil source 20 comprises a hydraulic oil pump 47 operatively associated with an engine (not shown), a flow rate adjusting valve 48 for maintaining the amount of working oil discharged into the oil supply passage 21 at a given level, and a relief valve 49 for preventing the hydraulic pressure in the oil supply passage 21 from excessively increasing.

The operation of this embodiment will be described below. During stoppage of the vehicle, the vehicle-speed sensor 41 is also inoperative, but the hydraulic pressure in the oil discharge passage 24 is maintained constant by the action of the pressureregulating valve 44 and acts on the pilot hydraulic oil chamber 36 through the sensor orifice 50. Therefore, the hydraulic pressure control valve 30 is in a closed state, so that the hydraulic reaction chamber 26 and the oil supply passage 21 are disconnected from each other.

If the steering shaft 10 is operated for rotation in such condition, the pinion holder 11 is rotated to operate the valve spool 14 of the directional control valve 12 in one direction. This causes a hydraulic pressure to be supplied into one of the hydraulic oil chambers 4 and 5 of the power cylinder 2, while the hydraulic pressure in the other hydraulic oil chamber escapes into the oil discharge passage 24, thereby providing a power assist to a manually steering force. In this case, there is no hydraulic pressure supplied into the hydraulic reaction chamber 26 and hence, the counterforce imparted to the valve spool 14 of the directional control valve 12 is only a value determined by the spring 29, so that the steering force may be lightened.

When the vehicle is travelling, the hydraulic pressure control valve 30 is opened in accordance with the rotation of the vehicle-speed sensor 41, so that the corresponding hydraulic pressure acts on the hydraulic reaction chamber 26. This results in that the higher the vehicle speed is, the heavier the steering force is.

Figure 3:
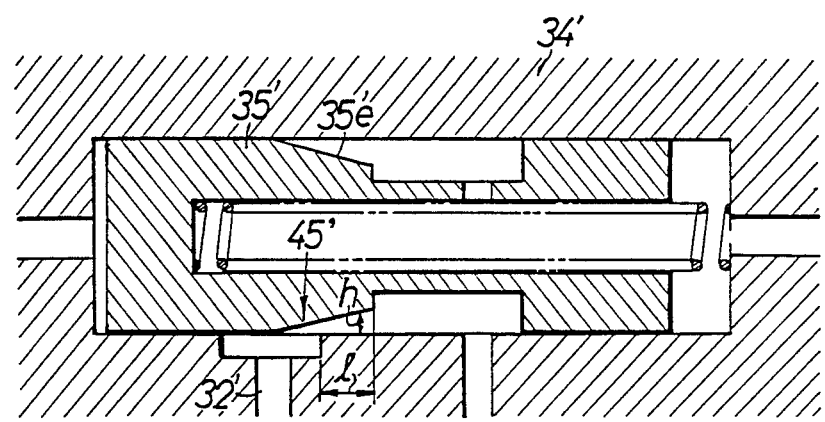
FIG. 3 is a longitudinal sectional view of a prior art hydraulic pressure control valve.
Figure 4:
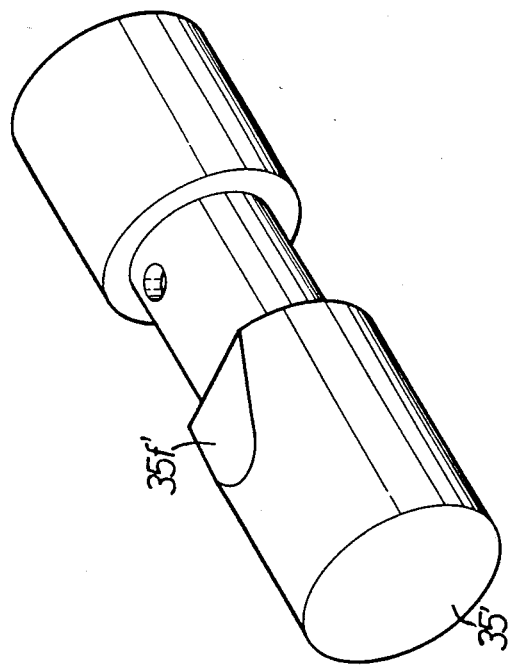
FIG. 4 is a perspective view of a valve spool in another prior art hydraulic pressure control valve.

Here, in the hydraulic pressure control valve 30, the variable orifice 45 is defined by the smaller diameter portion 35b of the inlet port 32, which diameter remains constant and the differential pressure Δ P varies directly in proportion to the variation of the dimension . In addition, only controlling of the feed of an edge tool is required for controlling of the distance h, and as compared with the prior art hydraulic pressure control valves shown in FIGS. 3 and 4, machining can be facilitated to improve the dimensional accuracy and to easily suppress the variation in property of the variable orifice 45 for every hydraulic pressure control valve 30.

The valve spool 35 of the hydraulic pressure control valve 30 has been designed to be driven in the closing direction by the force of the hydraulic pressure in the pilot hydraulic oil chamber 36, and in the opening direction by the force provided by the spring 39 in the above embodiment, but it will be understood that the present invention can be also applied to a hydraulic pressure control valve constructed so that the valve spool 35 is driven by a solenoid.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A hydraulic pressure control valve comprising a valve body having a slide bore of a circular cross-section and an inlet port and an outlet port opened into an inner surface of the slide bore at axially spaced apart points, and a valve spool slidably received in said valve body for axially sliding movement and defining, by cooperation with said valve body, a variable orifice for controlling the degree of communication between said inlet and outlet ports, wherein:

said valve spool comprises first and second land portions which are axially spaced from each other and are at all times in slidable contact with an inner surface of the slide bore, said first land portion being disposed adjacent said inlet port and said second land portion being disposed adjacent said outlet port, the valve spool further comprising a smaller diameter portion coaxial with the slide bore and having a diameter smaller than the diameter of the first land portion and connected to the first land portion by a step to define said variable orifice in cooperation with said inlet port, and an annular groove portion connected to the smaller diameter portion of the valve spool by a further step and having a diameter smaller than the diameter of the smaller diameter portion, said annular groove portion communicating at all times directly with said outlet port adjacent said second land portion.

2. A hydraulic pressure control valve according to claim 1, wherein said inlet port has an opened end opening into said inner surface of said slide bore, said opened end forming a part of said variable orifice.

3. A hydraulic pressure control valve according to claim 2, wherein the opened end of said inlet port is formed to be relatively long axially of said slide bore compared with its diameter.

4. A hydraulic pressure control valve comprising:

a valve body having a slide bore of a circular cross-section and uniform diameter, an inlet port for connection to a source of hydraulic fluid under pressure and an outlet port for discharge of hydraulic fluid opened into an inner surface of the slide bore at axially spaced apart points, and a valve spool slidably received in said valve body slide bore for axially sliding movement and defining, by cooperation which said valve body, a variable orifice for controlling the degree of communication between said inlet and outlet ports;

said valve spool comprising first and second land portions which are axially spaced from each other distally of said input and output ports and are at all times in slidable contact with an inner surface of said slide bore, said first land portion being disposed adjacent said inlet port and said second land portion being disposed adjacent said outlet port, the valve spool further comprising a smaller diameter portion coaxial with the slide bore and having a diameter over its entire length smaller than the diameter of the first land portion by a dimension h and connected to the first land portion by a substantially perpendicular step to define said variable orifice in cooperation with said inlet port; and an annular groove portion in said valve spool connecting the smaller diameter portion to the second land portion and having a diameter over its entire length smaller than the diameter of the smaller diameter portion, said annular groove portion communicating at all times with said outlet port adjacent said second land portion;

wherein said inlet port further includes an opened end formed in the inner surface of the slide bore to be relatively long axially of said slide bore as compared with a lateral dimension circumferentially of said slide bore, a distance between an axially inner end of said opened end and an edge of said smaller diameter portion closer to said annular groove being represented by the dimension such that the differential pressure $\Delta P$ produced across said variable orifice, which is substantially proportional to $/h^3$, varies only in proportion to variation in the dimension resulting from said axially sliding movement.

* * * * *